US008641007B2

(12) United States Patent
Chen

(10) Patent No.: US 8,641,007 B2
(45) Date of Patent: Feb. 4, 2014

(54) EXHIBITING RACK

(75) Inventor: Chao-Ken Chen, Changhua County (TW)

(73) Assignees: Chao-Ken Chen, Changhua County (TW); Greg Moore, Temple, TX (US)

( * ) Notice: Subject to any disclaimer, the term of this patent is extended or adjusted under 35 U.S.C. 154(b) by 366 days.

(21) Appl. No.: 12/962,746

(22) Filed: Dec. 8, 2010

(65) Prior Publication Data

US 2012/0056067 A1 Mar. 8, 2012

(30) Foreign Application Priority Data

Sep. 7, 2010 (TW) ................................ 99217286 U

(51) Int. Cl.
*A47B 63/00* (2006.01)

(52) U.S. Cl.
USPC ......... 248/448; 248/460; 248/458; 211/71.01

(58) Field of Classification Search
USPC ........... 248/471, 448, 469, 441.1, 125.2, 458, 248/460; 211/71.01, 85, 85.26, 189, 201, 211/175, 207

See application file for complete search history.

(56) References Cited

U.S. PATENT DOCUMENTS

| 7,537,184 | B1 * | 5/2009 | Basilicato et al. | ........ 248/123.11 |
| 7,604,481 | B2 * | 10/2009 | Owen et al. | .................... 434/408 |
| 7,810,658 | B2 * | 10/2010 | Clark et al. | .................... 211/189 |
| 7,942,372 | B2 * | 5/2011 | Koh | ............................ 248/125.8 |
| 2010/0155563 | A1 * | 6/2010 | Koh | .............................. 248/449 |

* cited by examiner

*Primary Examiner* — Steven Marsh

(57) ABSTRACT

An exhibiting rack for loading a billboard or bulletin board is disclosed. The rack includes a fixed frame and a movable frame. The movable frame is mounted by a board to be exhibited and linearly slidable against the fixed frame. The movable frame is disposed on the fixed frame and an extension stem is disposed therebetween. A fixed end and action end of the extension stem are connected to the fixed frame and movable frame, respectively. The extension stem exerts a force on the movable frame to support the movable frame with a board to a desired height.

17 Claims, 8 Drawing Sheets

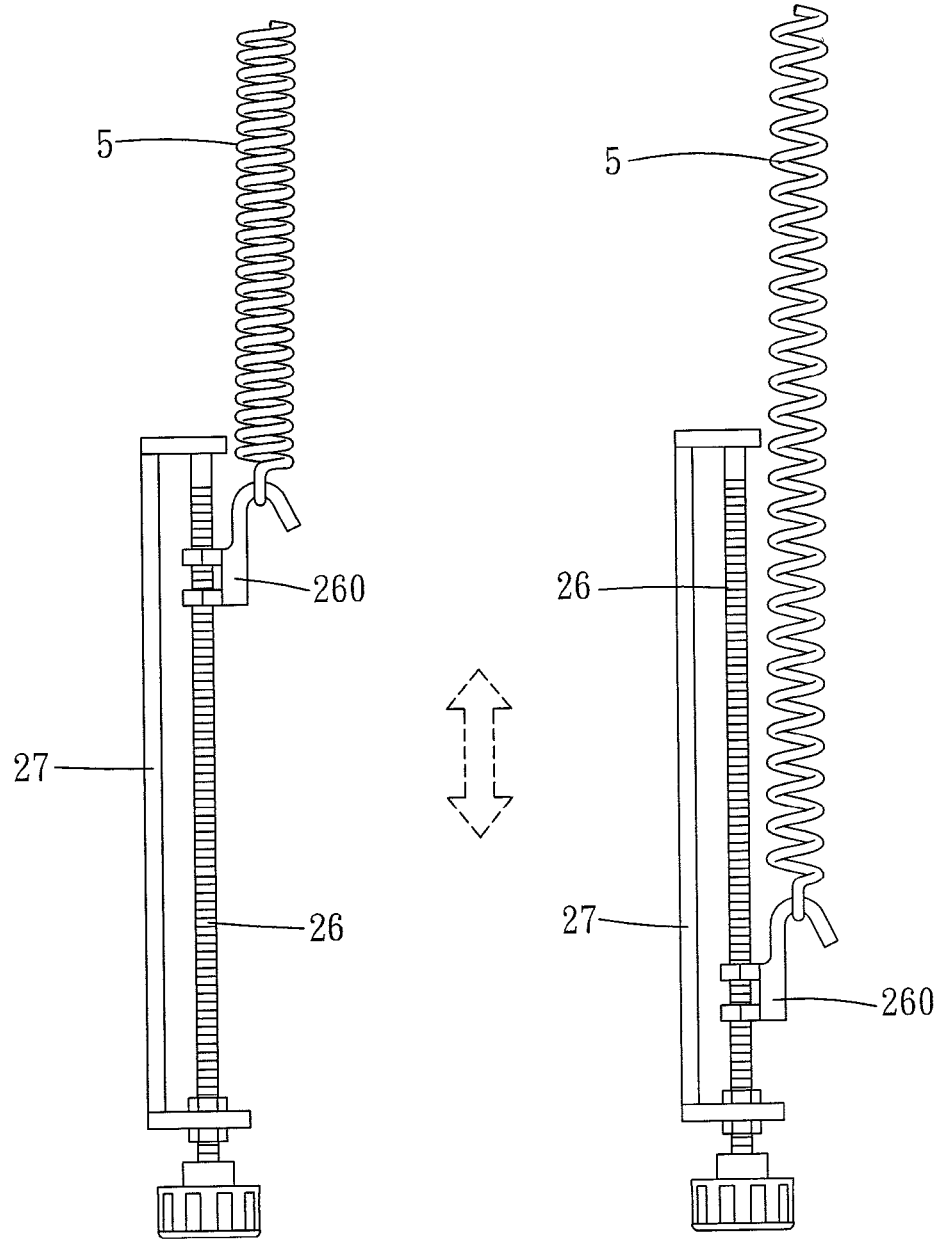

EXHIBITING RACK

BACKGROUND OF THE INVENTION

1. Technical Field

The invention relates to racks for loading billboards or bulletin boards, particular to racks capable of adjusting height of such boards.

2. Related Art

Usually, those large boards such as black boards or white boards used in classroom or exhibition are fastened on a wall because of cumbersomeness. If those boards placed in a classroom or exhibition cannot be adjusted in height, the information on the boards will not be clearly seen by the audience. Further, the weight of those large boards may exceed 100 kg, the supports of them must be difficult in structure.

SUMMARY OF THE INVENTION

A primary object of the invention is to provide an exhibiting rack which can support large boards and can be adjusted in height.

Another object of the invention is to provide an exhibiting rack which can stably and slowly move the loaded board to avoid accident.

Still another object of the invention is to provide an exhibiting rack which has a puller spring for stabilizing the moving action. And the elasticity of the puller spring can be adjusted for matching various boards with different weight.

To accomplish the above object, the exhibiting rack of the invention includes a fixed frame and a movable frame. The movable frame is mounted by a board to be exhibited and linearly slidable against the fixed frame. The movable frame is disposed on the fixed frame and an extension stem is disposed therebetween. A fixed end and action end of the extension stem are connected to the fixed frame and movable frame, respectively. The extension stem exerts a force on the movable frame to support the movable frame with a board to a desired height.

BRIEF DESCRIPTION OF THE DRAWINGS

FIGS. 5 and 6 show the adjustment of the puller spring;

DETAILED DESCRIPTION OF THE INVENTION

Figure 1:
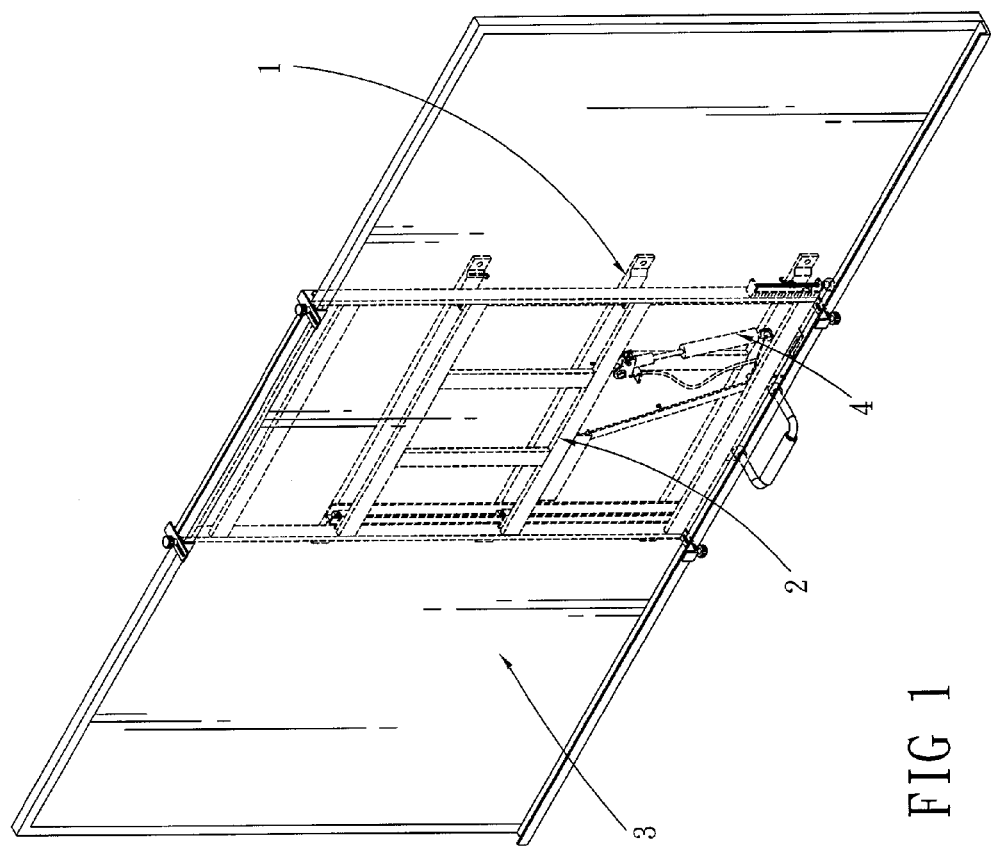
FIG. 1 is a perspective view of the invention.
Figure 2:
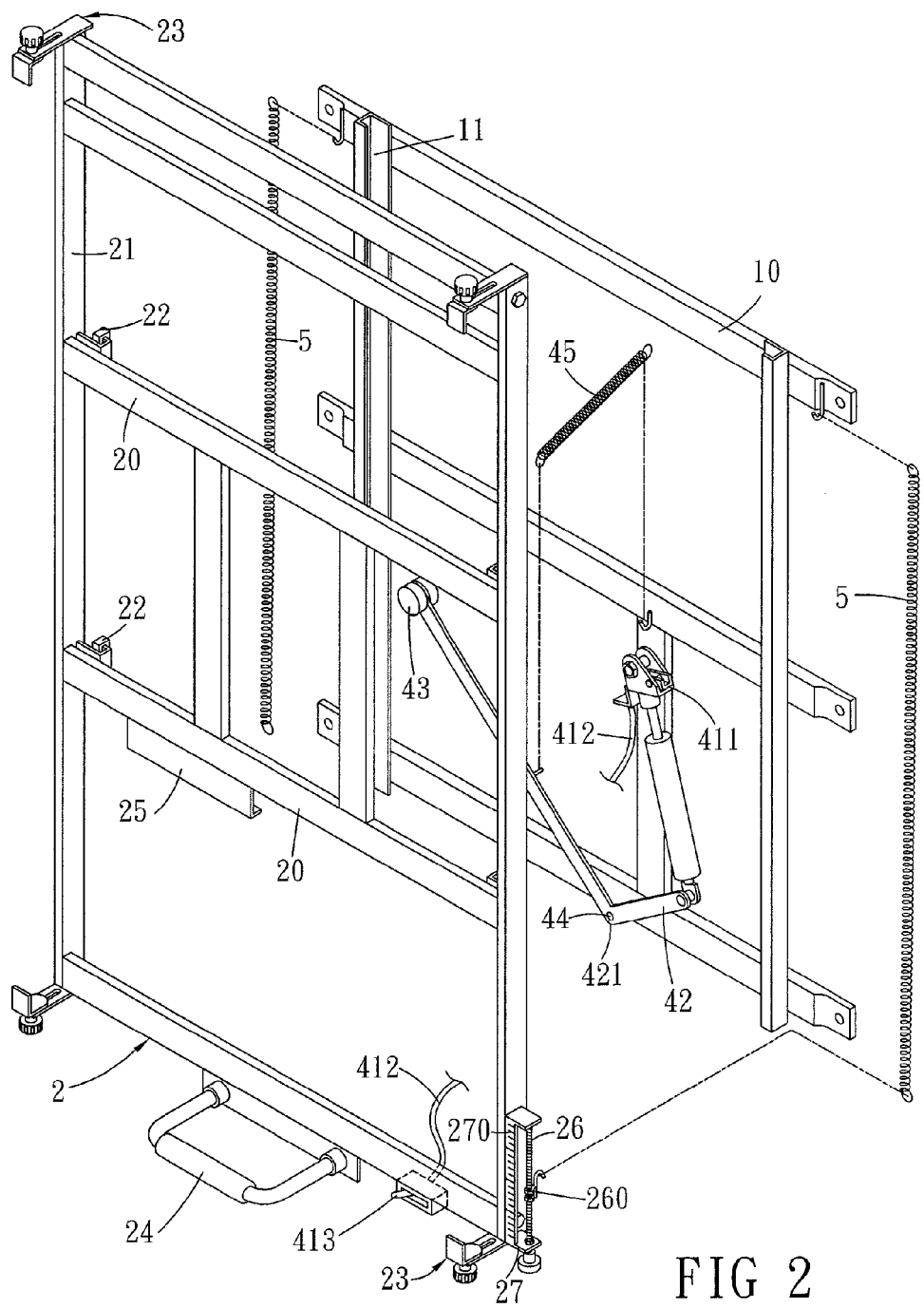
FIG. 2 is an exploded view of the invention.

Please refer to FIGS. 1-4. The exhibiting rack includes a fixed frame 1 and a movable frame 2. The fixed frame 1 is used to fix at a predetermined position, and the movable frame 2 is used to load an exhibiting board 3 and is slidable against the fixed frame 1.

The fixed frame 1 includes a frame body 10 and a pair of rails 11 mounted thereon.

The movable frame 2 is assembled on the fixed frame 1 and includes a main frame 20 and a framework 21 for loading the exhibiting board 3. The main frame 20 is provided with a plurality of sliders 22 penetrating into the rails 11. The movable frame 2 can be moved by the sliders 22 sliding on the rails 11. The framework 21 is provided with two holding members 23 for holding the exhibiting board 3. Besides, a handle 24 is disposed on the movable frame 2 for assisting operation of the movable frame 2.

The holding member 23 includes a mount plate 230, a clamper 231 on the mount plate 230 and a nut 232 for fastening the clamper 231. The mount plate 230 is provided with a sliding hole 233. The bottom of the clamper 231 is formed with a positioning rod 234 penetrating the sliding hole 233. The positioning rod 234 can linearly move in the sliding hole 233 so as to adjust the position of the clamper 231. And the positioning rod 234 can be screwed by the nut 232 to fasten the clamper 231. By adjusting the position of the clamper 231, various exhibiting boards 3 with different thickness can be clamped. Preferably, a clamper 231 may be provided with two positioning rods 234, 234a penetrating the sliding hole 233. The clamper 231 can be unrotatably fixed by the two fastening points.

An extension stem 4 with braking ability is disposed between the movable frame 2 and the fixed frame 1. The extension stem 4 may be a gas spring composed of a cylinder 40 and an action rod 41. The action rod 41 can be axially moved by the air pressure in the cylinder 40. The extension stem 4 has a fixed end 410 fastened on the frame body 10 of the fixed frame 1 and an action end 400 connecting the movable frame 2. The extension stem 4 may exert a force on the movable frame 2 to shift the movable frame 2 along the rails 11.

A switch 411 for triggering the extension stem 4 is disposed near the fixed end 410 of the extension stem 4. The switch 411 is controlled by a cord 412. A distal end of the cord 412 connects to a driver 413 on the movable frame 2. When the driver 413 is stirred, the cord 412 will be pulled to trigger the switch 411 and the extension stem 4 will be activated by the switch 411. As abovementioned, the extension stem 4 may be a gas spring, if the action rod 41 serves as the fixed end 410, then the cylinder 40 serves as the action end 400. When the gas spring is activated, the action end 400 will protrude outwards to drive the movable frame 2.

Preferably, the action end 400 of the extension stem 4 connects a guiding rod 42 whose distal end is a free end and provided with a sliding member 43. The sliding member 43 may be a wheel and associates with the movable frame 2. The guiding rod 42 is formed with a bend 421. The bend 421 is pivotally connected to the frame body 10 by a shaft 44. The length between the action end 400 of the extension stem 4 and the bend 421 is smaller than the length between the bend 421 and the sliding member 43. Thus the guiding rod 42 functions as a lever and the shaft 44 serves as a fulcrum. Further, an end of a spring 45 is fixed at a section of the guiding rod 42 between the bend 421 and sliding member 421, and the other end is fixed at the frame body 10 for providing a buffer force when the guiding rod 42 is acting.

The main frame 20 of the movable frame 2 is provided with a slideway 25 for accommodating the sliding member 43 so as to have the sliding member only move in the slideway 25.

Figure 3:
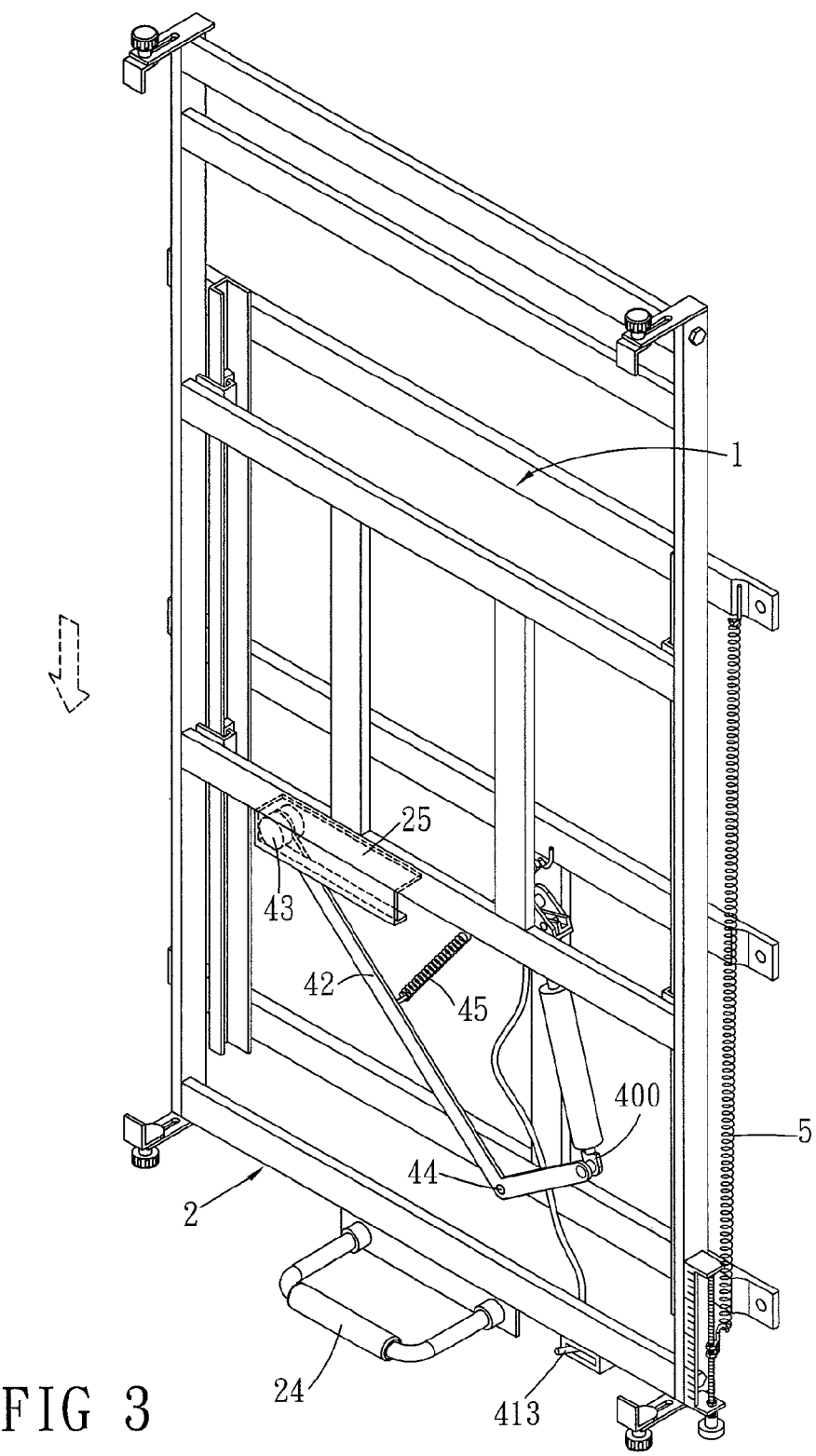
FIG. 3 is an assembled view of the invention in which the movable frame is in a low position.
Figure 4:
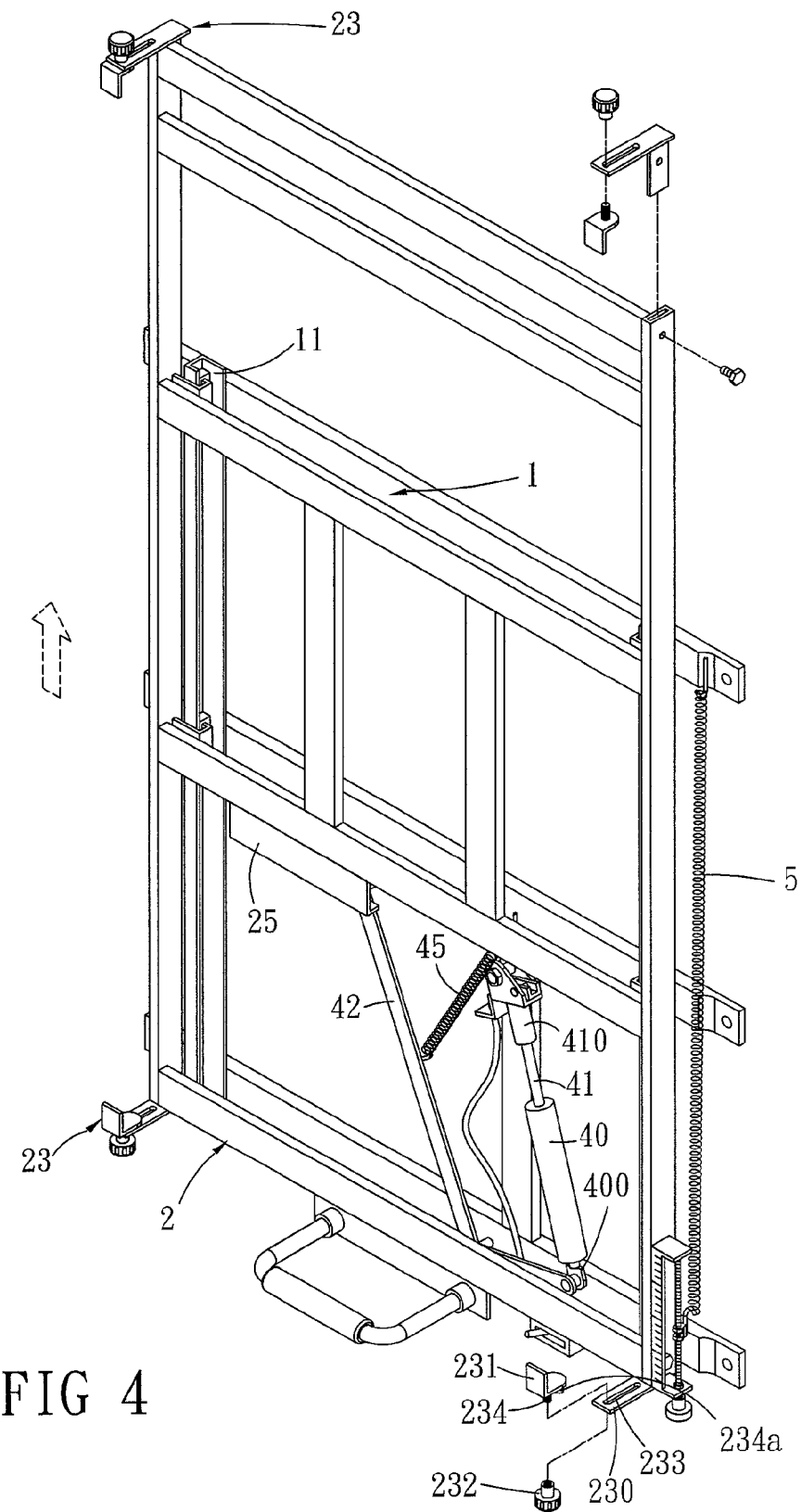
FIG. 4 is an assembled view of the invention in which the movable frame is in a high position.

Please refer to FIGS. 3 and 4. FIG. 3 illustrates the movable frame 2 at a lower position. When the extension stem 4 is activated, its action end 400 pushes the guiding rod 42 to turn about the shaft 44. The free end of the guiding rod 42 is limited and slid in the slideway 25, so that the guiding rod 42 generates a force pushing up the movable frame 2 as shown in FIG. 4. When the movable frame 2 reaches a desired position, a user may release the driver 413 to stop the extension stem 4 and thus the movable frame 2 is fixed instantly. That is, the extension stem 4 associating with the guiding rod 42 pushes the movable frame 2 to form a height variation. It should be noted that the guiding rod 42 pushes up the movable frame 2 by a horizontal motion. Thus the shift of the moveable frame 2 is slow and stable. It can avoid accidents resulting from quick shift if the loaded board is very heavy. When a user wants to lower the movable frame 2, all he or she needs to do is to stir the driver 413 to release the extension stem 4 and to slightly exert a downward force on the handle 24, then the board 3 will lower by its weight. Once the movable frame 2 is lowered to the desired position, the user re-stirs the driver 413 to brake the extension stem 4, then the movable frame 2 is fixed instantly. At this time, the sliding member 43 goes back to the initial position as shown in FIG. 3. Additionally, the spring 45 is stretched to form a buffer resistance. This can slow down the lowering of the movable frame 2 for safety.

Besides, two puller springs 5 are disposed between the fixed frame 1 and the movable frame 2 for dragging each other. In detail, one end of each the puller spring 5 is fastened on the fixed frame 1 and the other end thereof is fastened on the movable frame 2. The puller springs 5 can stabilize the connection between the movable frame 2 and fixed frame 1. The puller springs 5 provides an auxiliary force to the movable frame 2 when rising and a buffer resistance to it when lowering.

Please refer to FIGS. 5 and 6. In order to accurately control the puller springs 5, a screw rod 26 is disposed on the movable frame 2. One end of the puller spring 5 is preferably fastened to a bracket 260 which is screwed on the screw rod 26 and may be axially moved by rotating the screw rod 26. By the axial movement of the bracket 260, the elasticity of the puller springs 5 can be adjusted for matching various boards 3 with different weight. More preferably, a scale 27 may be arranged on the movable frame 2 near the screw rod 26 for a reference of adjusting the puller springs 5.

Figure 7:
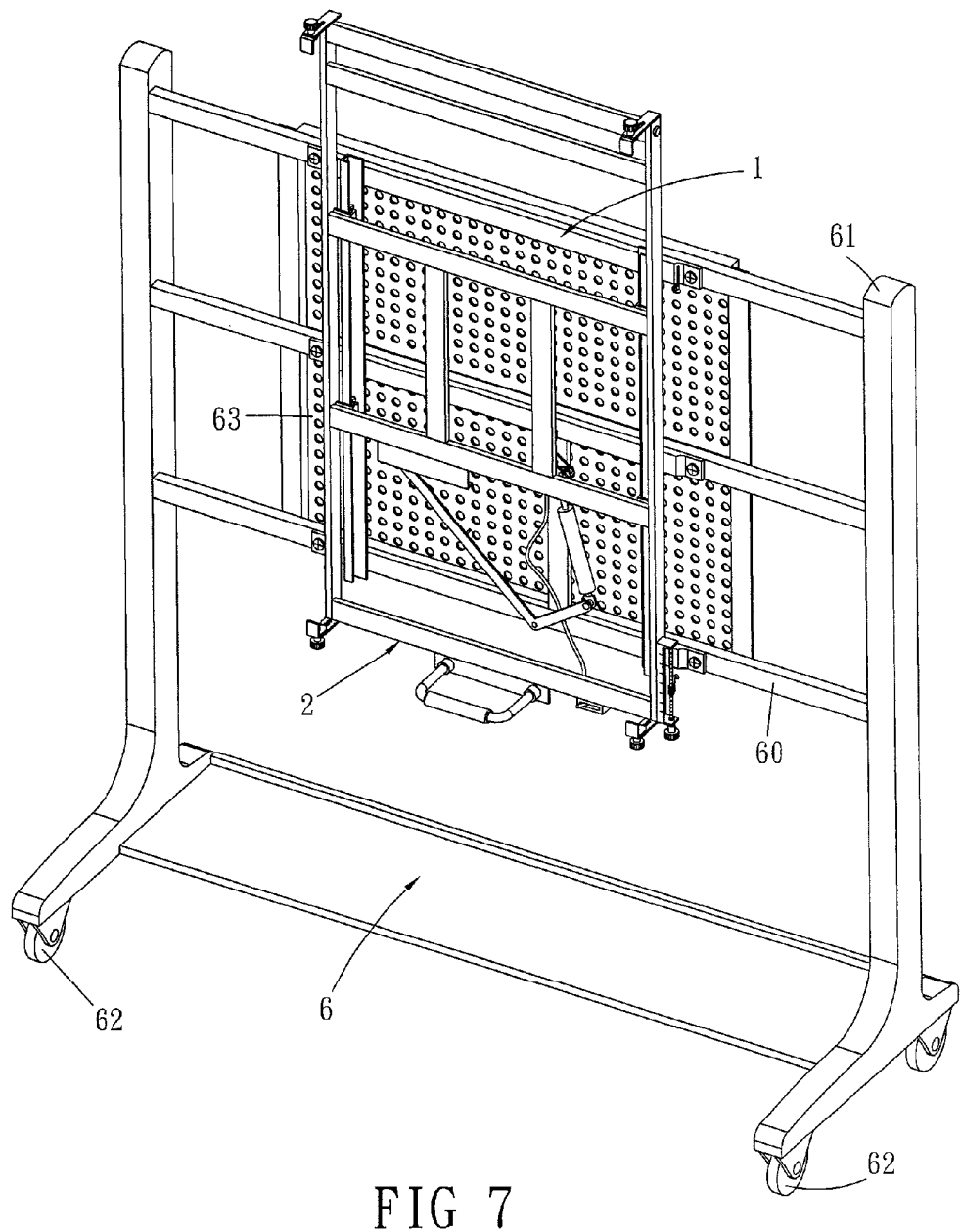
FIG. 7 is a schematic view showing the invention mounted on a wheeled stand.

Please refer to FIG. 7. In order to have the exhibiting rack moved easily, the fixed frame 1 is mounted on a wheeled stand 6. The wheeled stand 6 has a stand body 61 and a support frame 60 on which the fixed frame 1 is mounted. A plurality of wheels 62 are disposed on the bottom of the stand body 61. The support frame 60 is further provided with a cover board 63 for cloaking and protecting the dynamic components of the movable frame 2.

Figure 8:
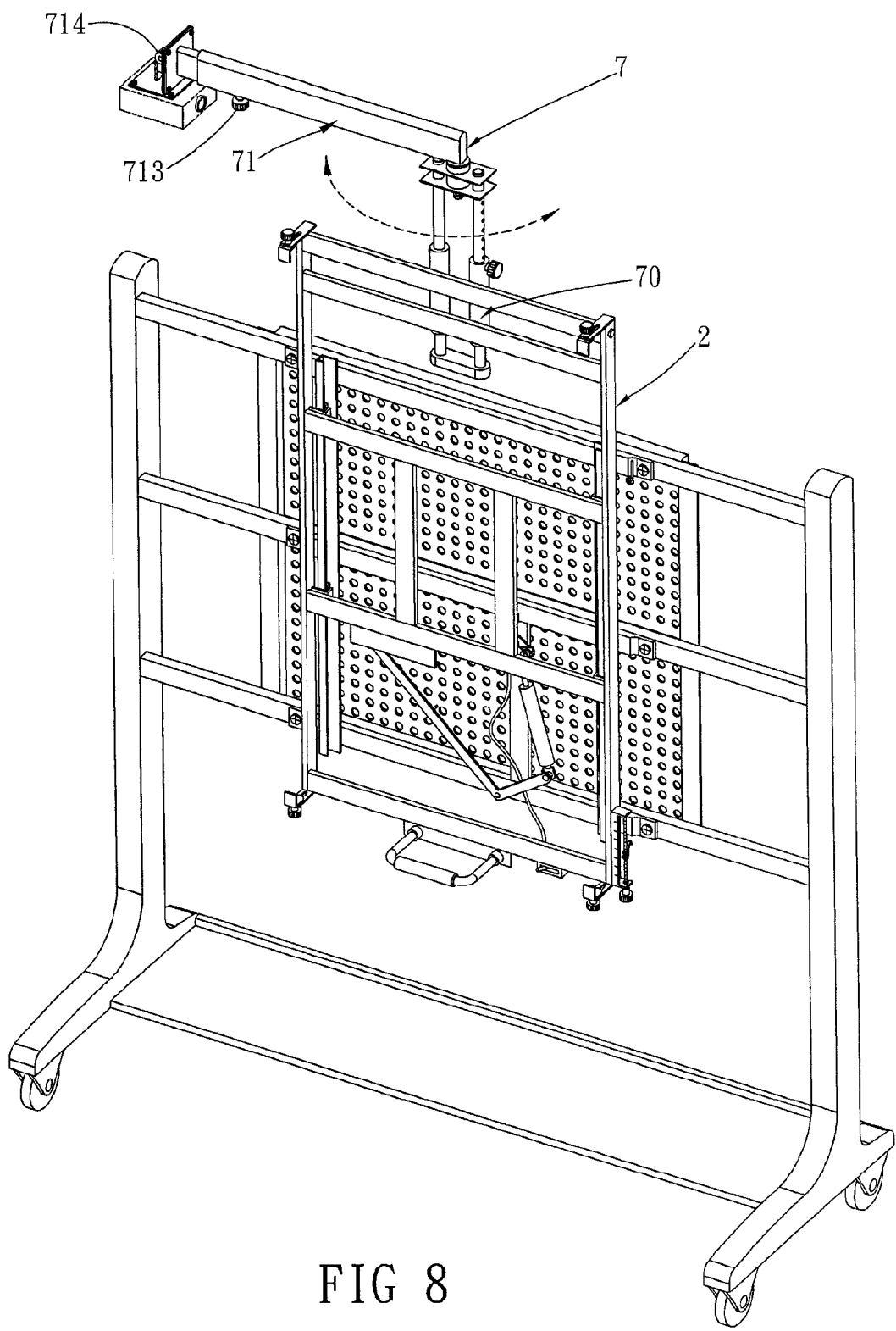
FIG. 8 is a schematic view of the invention with an auxiliary arm.
Figure 9:
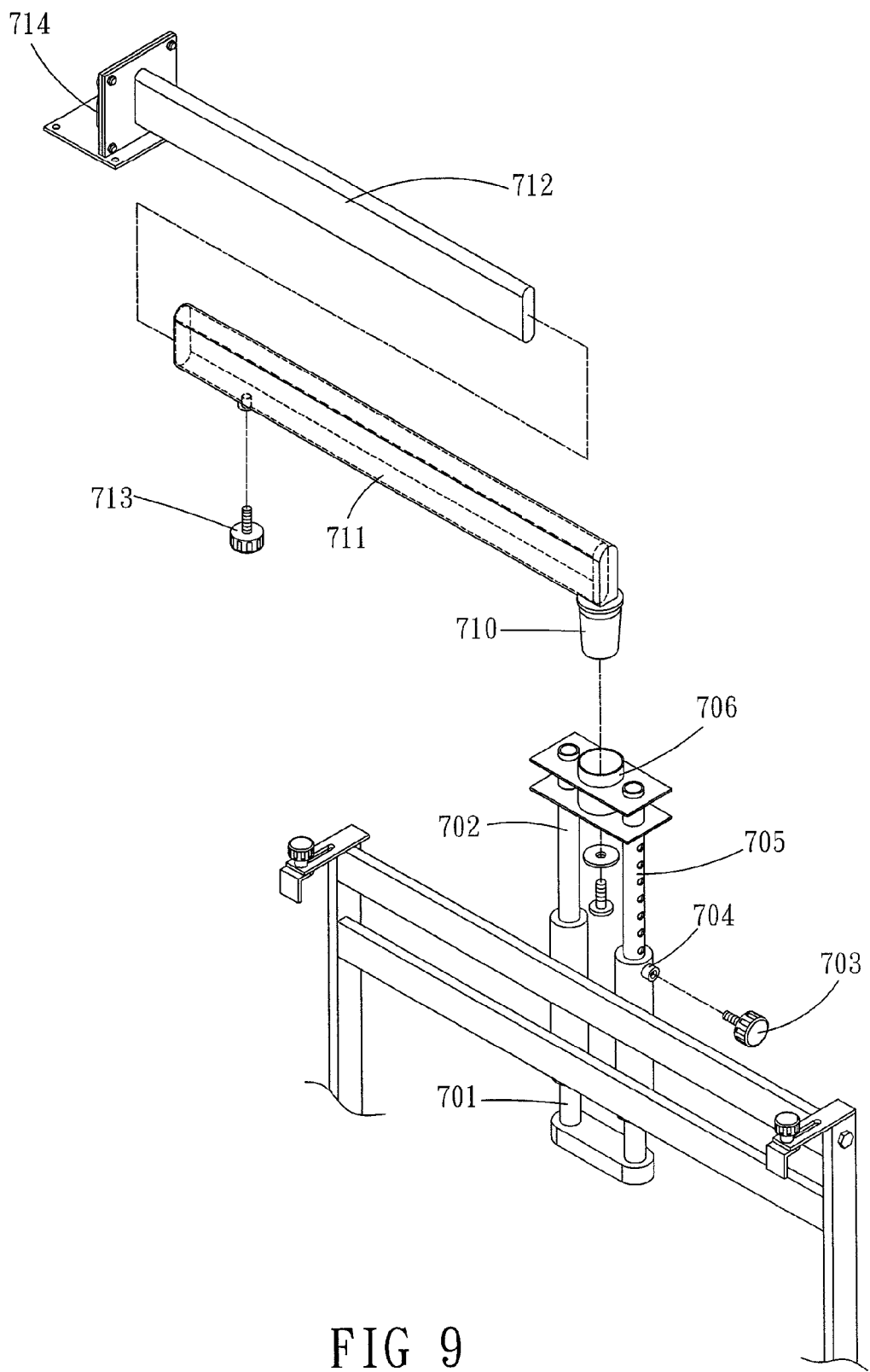
FIG. 9 is an explode view of the auxiliary arm.

Please refer to FIG. 8. The movable frame 2 may be preferably provided with an auxiliary arm 7 including a support body 70 mounted on the movable frame 2 and a rotatable rod 71 pivotally connected on the support body 70. As shown in FIG. 9, the support body 70 has a fixed portion 701, an extensible portion 702 and a thumbscrew 703. The fixed portion 701 is mounted on the movable frame 2. The extensible portion 702 slidably penetrates into the fixed portion 702. The fixed portion 701 is provided with a through hole 704 and the extensible portion 702 is provided with a series of tapped holes 705. The extensible portion 702 can be adjustably fastened to the fixed portion 701 by inserting the thumbscrew 703 into the through hole to screw in one of the tapped holes 705. The extensible portion 702 is further provided with a sleeve seat 706 for being penetrated by the rotatable rod 71.

The rotatable rod 71 includes a spindle 710, a sleeve 711 perpendicularly connecting the spindle 711, a bar 712 put in the sleeve 711 and a screw 713. The spindle 710 pivotally penetrates into the sleeve seat 706. A distal end of the bar 712 is provided with a universal connector 714 for connecting an external device such as a projector. The bar 712 can be adjustably stretched from the sleeve 711 and fixed by the screw 713. Thus the auxiliary arm 7 can be used to connect a projector for making presentation.

What is claimed is:

1. An exhibiting rack comprising:
 a fixed frame comprising a frame body and a pair of rails mounted thereon;
 a movable frame slidably mounted on the fixed frame, comprising a main frame and a framework, wherein the main frame is provided with two sliders slidably penetrating into the rails;
 an extension stem with braking ability, disposed between the movable frame and the fixed frame, having a fixed end fastened on the frame body of the fixed frame and an action end connecting the movable frame, and capable of exerting a force on the movable frame to shift the movable frame along the rails; and
 two puller springs symmetrically disposed between the fixed frame and the movable frame for dragging each other, wherein one end of each puller spring is fastened on the fixed frame and another end thereof is fastened on the movable frame.

2. The exhibiting rack of claim 1, wherein the extension stem is a gas spring.

3. The exhibiting rack of claim 1, wherein a switch for triggering the extension stem is disposed near the fixed end of the extension stem, the switch is controlled by a cord, a distal end of the cord connects to a driver on the movable frame, when the driver is stirred, the cord will be pulled to trigger the switch and the extension stem will be activated by the switch.

4. The exhibiting rack of claim 1, wherein the action end of the extension stem connects a guiding rod whose distal end is a free end and provided with a sliding member associated with the movable frame, and the guiding rod is formed with a bend pivotally connected to the frame body by a shaft.

5. The exhibiting rack of claim 4, wherein an end of a spring is fixed at a section of the guiding rod between the bend and sliding member, and another end thereof is fixed at the frame body for providing a buffer force when the guiding rod is acting.

6. The exhibiting rack of claim 4, wherein the main frame of the movable frame is provided with a slideway for accommodating the sliding member so as to have the sliding member only move in the slideway.

7. The exhibiting rack of claim 4, wherein the sliding member is a wheel.

8. The exhibiting rack of claim 1, wherein the framework is provided with two holding members for holding an exhibiting board, the holding member includes a mount plate, a clamper on the mount plate and a nut for fastening the clamper, the mount plate is provided with a sliding hole, a bottom of the clamper is formed with a positioning rod penetrating the sliding hole, the positioning rod linearly moves in the sliding hole so as to adjust a position of the clamper, and the positioning rod is screwed by the nut to fasten the clamper.

9. The exhibiting rack of claim 8, wherein the clamper is formed with two positioning rods together penetrating into the sliding hole.

10. The exhibiting rack of claim 1, wherein a screw rod is disposed on the movable frame, one end of the puller spring is fastened to a bracket which is screwed on the screw rod.

11. The exhibiting rack of claim 10, wherein a scale is arranged on the movable frame near the screw rod for a reference of adjusting the puller springs.

12. The exhibiting rack of claim 1, wherein the fixed frame is mounted on a wheeled stand, the wheeled stand has a stand body and a support frame on which the fixed frame is mounted, and a plurality of wheels are disposed under the stand body.

13. The exhibiting rack of claim 12, wherein the support frame is provided with a cover board for cloaking and protecting dynamic components of the movable frame.

14. The exhibiting rack of claim 1, wherein the movable frame is provided with an auxiliary arm including a support body mounted on the movable frame and a rotatable rod pivotally connected on the support body.

15. The exhibiting rack of claim 14, wherein the support body has a fixed portion, an extensible portion and a thumbscrew, the fixed portion is mounted on the movable frame, the extensible portion slidably penetrates into the fixed portion, the fixed portion is provided with a through hole, the extensible portion is provided with a series of tapped holes, the extensible portion is adjustably fastened to the fixed portion by inserting the thumbscrew into the through hole to screw in one of the tapped holes, and the extensible portion is further provided with a sleeve seat for being penetrated by the rotatable rod.

16. The exhibiting rack of claim 15, wherein the rotatable rod includes a spindle, a sleeve perpendicularly connecting the spindle, a bar put in the sleeve and a screw, the spindle pivotally penetrates into the sleeve seat, a distal end of the bar is provided with a universal connector for connecting an external device, the bar is adjustably stretched from the sleeve and fixed by the screw.

17. The exhibiting rack of claim 1, wherein the movable frame is provided with a handle.

\* \* \* \* \*